Patented June 24, 1930

1,766,719

UNITED STATES PATENT OFFICE

PAUL NAWIASKY AND ARTUR KRAUSE, OF LUDWIGSHAFEN-ON-THE-RHINE, AND ALFRED HOLL, OF OFFENBACH-ON-THE-MAIN, GERMANY, ASSIGNORS TO GENERAL ANILINE WORKS, INC., OF NEW YORK, N. Y., A CORPORATION OF DELAWARE

ALKYLATION PRODUCTS OF PYRAZOLANTHRONES

No Drawing. Application filed December 21, 1926, Serial No. 156,256, and in Germany December 22, 1925.

This invention relates to the production of alkylation products of pyrazolanthrones.

We have now found that the pyrazolanthrones obtainable according to the process of the German Patent 171,293 are transformed into alkylation products by the action of alkyl compounds containing at least one interchangeable substituent on pyrazolanthrone or its nuclear substitution products which term is meant to comprise compounds containing in their structure not more than one pyrazolanthrone residue. The compounds thus obtained are regarded as alkyl-pyrazolanthrones and alqylene-di-pyrazolanthrones.

For example, alkyl pyrazolanthrones are obtainable by the treatment of pyrazolanthrone or its nuclear substitution products with alkylating agents such as the alkyl halogenides, alkyl esters of sulfuric acid or of aromatic sulfonic acids and the like. This reaction may be carried out in various ways. Thus, for example, the treatment may be carried out in the usual manner in the presence of agents capable of combining with acids. Or it may be effected with the alkali metal salts of pyrazolanthrones in aqueous solution, or by heating the said alkali metal salts with alkyl halogenides in the absence of any solvent or diluent and with or without the aid of catalysts. Generally the reaction does not proceed uniformly, and as a rule a mixture of varying proportions of different products is obtained which it is more or less easy to separate. Thus, pyrazolanthrone when treated with the methyl ester of toluene sulfonic acid, in the presence of sodium carbonate in trichlorbenzene, furnishes a product from which two substances of entirely different character can be separated. Only one of these two substances is capable of forming vat dyestuffs with alkaline condensing agents. In some cases only the compound unsuitable for the production of vat dyestuffs is formed.

We have found that these difficulties in the production of the alkyl-pyrazolanthrones suitable for being converted into vat dyestuffs may be obviated and uniform products may be obtained if pyrazolanthrones are treated with alkylating agents in presence of acid condensing agents. Very suitably, the pyrazolanthrones may be alkylated by heating to an elevated temperature with the alkyl esters of sulfuric acid or of aryl sulfonic acid, or suitable mixtures of a pure alcohol and sulfuric acid, which mixtures are to be regarded as equivalents of sulfuric acid alkyl esters.

Alkylene-di-pyrazolanthrones are obtainable by the action on alkali metal compounds of pyrazolanthrone or its nuclear substitution products, of alkyl compounds containing two interchangeable substituents such for example as di-halogen compounds of paraffin hydrocarbons, for example methylene chlorid, ethylene bromid, or 1.2-dibrompropane, or di-aryl sulfonic acid esters of glycols such as ethylene glycol di-toluene sulfonic acid ester, and the like. In the case of the production of dyestuffs from alkylene-di-pyrazolanthrones, no attention need be paid to the properties of these compounds as it has not been observed up to now that several compounds of different properties are formed as in the case of alkyl-pyrazolanthrones.

The following examples further illustrate how the invention may be carried out in practice, but the invention is not restricted thereto. The parts are by weight.

Example 1

20 parts of the dry sodium compound of pyrazolanthrone are heated in an autoclave for about 2 hours to 150° C. with 80 parts of ethyl bromide and 0.2 part of copper acetate. The mass is then allowed to cool and the brown crystals formed (having the form of needles) are separated from ethyl bromide and sodium bromide. The ethyl pyrazolanthrone thus obtained melts at 183 to 186° C. and is practically pure. The reaction proceeds according to the following equation

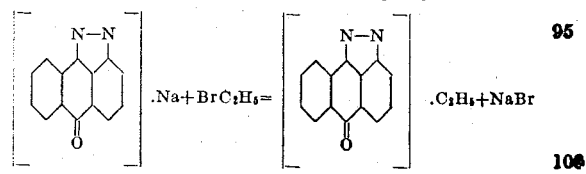

Example 2

22 parts of pyrazolanthrone are dissolved in 57.5 parts of caustic soda lye of 40° Bé. strength and 200 parts of water, with an addition of 80 parts of ethyl alcohol. 50 parts of dimethyl sulfate are slowly run into this solution at about 40° C., cooling being applied if necessary; in order to prevent the temperature from exceeding 40° C. After stirring for several hours, the methylation product is filtered off, washed and dried. On crystallization from monochlorbenzene, it is obtained in the form of yellow crystals melting at about 161° C. and dissolving in concentrated sulfuric acid to a yellowish red solution showing green fluorescence. The same product is obtained by suspending the pyrazolanthrone in water with an addition of caustic alkali solution and adding the dimethyl sulfate at a moderately elevated temperature. The methylation product has the formula

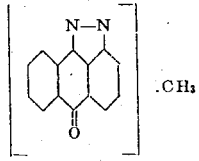

In a similar manner, ethyl derivatives of pyrazolanthrone may be obtained.

Example 3

32 parts of methyl alcohol are slowly run into 120 parts of concentrated sulfuric acid at temperatures below 40° C. the addition being accompanied by rapid stirring and cooling. 20 parts of pyrazolanthrone are then introduced into the mixture, the whole being gradually raised to a temperature of 170° C. and there maintained for about 3 hours. The completion of the reaction is indicated when a sample, taken from the melt and diluted with water, furnishes a precipitate which is no longer soluble in dilute caustic alkali solutions. The melt is then poured into water and the product filtered off by suction, freed if necessary from any unaltered original material by warming with dilute alkali metal hydroxide, and dried. A complete purification of the product may be effected by recrystallization from monochlorbenzene. Monomethylpyrazolanthrone is obtained in the form of yellow needles melting at the temperature of 221 to 224° C and has the formula

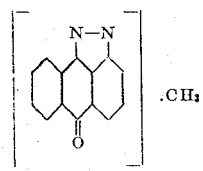

If 5-chlor-1.9-pyrazolanthrone be taken in place of pyrazolanthrone, 5-chlormonomethyl-1.9-pyrazolanthrone, melting at the temperature of 225 to 227° C., is obtained which has the formula

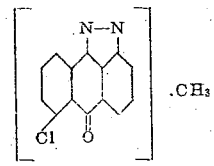

The employment of ethyl alcohol in place of methyl alcohol leads to an ethylpyrazolanthrone.

Example 4

5 parts of pyrazolanthrone are introduced into a mixture of 10 parts of sulfuric acid (66° Baumé), 10 parts of anhydrous boric acid and 15 parts of dimethyl sulfate, and the mass is heated to a temperature of 160° C. and stirred for 6 hours. It is then allowed to cool, poured into water, and the solid product is filtered off by suction, washed thoroughly with water and dried at a moderate temperature. It is purified by crystallization from monochlorbenzene. The compound is identical with that obtainable in accordance with Example 3.

Example 5

20 parts of pyrazolanthrone are stirred into a mixture of 40 parts of sulfuric acid (66° Baumé) and 40 parts of anhydrous boric acid, 60 parts of toluene sulfonic acid methyl ester being added. The mixture is then heated, while stirring, to a temperature of 160° C. and is maintained at that temperature for 2 hours. The further treatment is as in Example 4. On crystallization, the crude product furnishes the N-methyl-pyrazolanthrone described in Example 3.

Example 6

1 part of pyrazolanthrone is heated for several hours with the same amounts of carbonate of soda and of the methyl ester of toluene sulfonic acid, in 30 parts of trichlorbenzene, whereupon the latter is expelled by steam distillation. The residue can be separated into two isomeric monomethylpyrazolanthrones one of which is identical with the product obtained according to Example 3, the other of which forms yellow needles melting at the temperature of 184 to 187° C. The separation may suitably be carried out by consecutive fractional crystallization from for instance methanol, glacial acetic acid or monochlorbenzene.

Example 7

The sodium compound of pyrazolanthrone is condensed with methylene chlorid by heating with an excess of the latter at 140 to 150° C. in an autoclave. The condensation product when crystallized from dichlorbenzene melts at 350 to 355° C. and has the composition as determined by analysis $$CH_2 = (C_{14}H_7ON_2)_2.$$

*Example 8*

A condensation product of ethylene bromide and the sodium compound of pyrazolanthrone may be obtained by heating the said sodium compound for example with twice its weight of ethylene bromide to 140 to 150° C. When crystallized from trichlorbenzene, it melts at 364 to 368° C. The product thus obtained has the formula

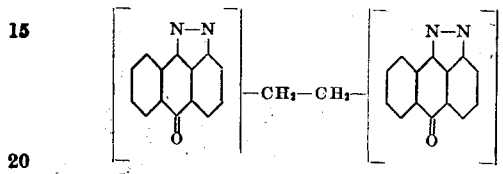

We claim:

1. As new articles of manufacture, compounds of paraffin-hydrocarbons with at least one molecule of a pyrazolanthrone.

2. As new articles of manufacture, pyrazolanthrones containing at least one alkyl group in the pyrazol nucleus.

3. As new article of manufacture, N-methyl-pyrazolanthrone which, when pure, forms yellow needles melting at 221° to 224° C.

In testimony whereof we have hereunto set our hands.

PAUL NAWIASKY.
ARTUR KRAUSE.
ALFRED HOLL.